H. M. HEIMERDINGER.

APPARATUS FOR PRODUCING A FOOD PRODUCT.

APPLICATION FILED JAN. 17, 1919.

1,295,161. Patented Feb. 25, 1919.

H. M. Heimerdinger
Inventor

By C. A. Snow & Co.
Attorneys

H. M. HEIMERDINGER.
APPARATUS FOR PRODUCING A FOOD PRODUCT.
APPLICATION FILED JAN. 17, 1919.

1,295,161.

Patented Feb. 25, 1919.
2 SHEETS—SHEET 2.

H. M. Heimerdinger
Inventor

By C. A. Snow & Co.
Attorneys

UNITED STATES PATENT OFFICE.

HARRY M. HEIMERDINGER, OF BLACKFOOT, IDAHO.

APPARATUS FOR PRODUCING A FOOD PRODUCT.

1,295,161. Specification of Letters Patent. Patented Feb. 25, 1919.

Application filed January 17, 1919. Serial No. 271,706.

*To all whom it may concern:*

Be it known that I, Harry M. Heimerdinger, a citizen of the United States, residing at Blackfoot, in the county of Bingham and State of Idaho, have invented a new and useful Apparatus for Producing a Food Product, of which the following is a specification.

This invention relates to apparatus for use in producing a food product from vegetables and the like, one of the objects being to press the cooked articles so as to force the pulp through the skins and form it into grains in which the water cells have been ruptured and opened, the said grains being subsequently spread out and dried so that the resultant product will be in the form of a hard, crystalline and porous substance.

A further object is to provide a press of simple and compact form, large capacity, and which will not become clogged.

Another object is to provide a machine of this character which is entirely automatic and which has efficient means combined therewith for spreading the shreds over a drying belt or the like.

With the foregoing and other objects in view which will appear as the description proceeds, the invention consists of certain novel details of construction and combinations of parts which will be hereinafter more fully described and pointed out in the claims.

In the accompanying drawings the preferred form of the invention has been shown.

In said drawings—

Figures 1, 2:
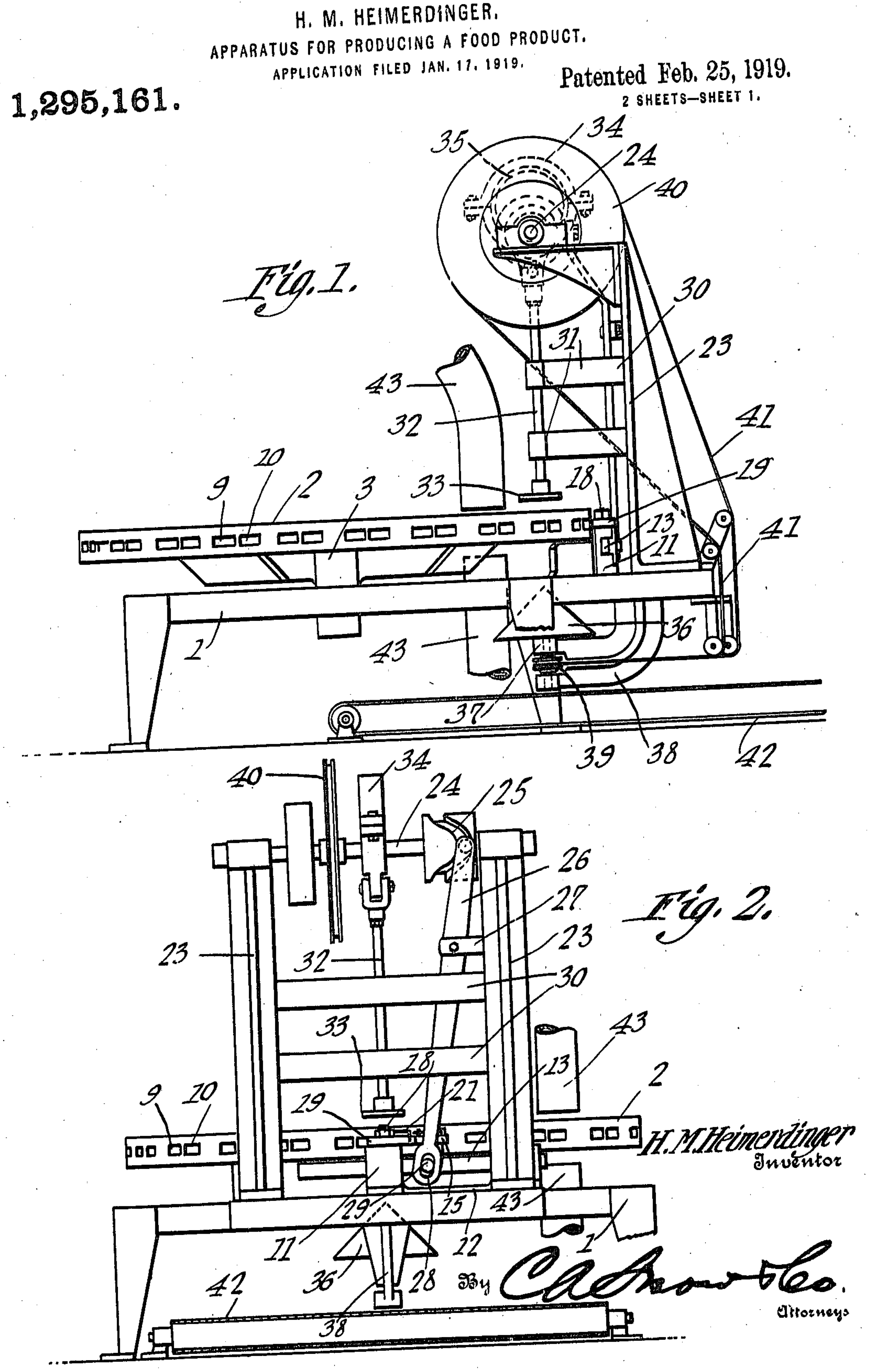
Figure 1 is a side elevation of the machine.
Fig. 2 is a front elevation thereof.

Referring to the figures by characters of reference, 1 designates a supporting structure on which a circular table 2 is mounted for rotation. This table has a central bearing stud 3 extending downwardly therefrom and journaled in the support, and formed in the table near its periphery is a circular series of openings 4 each of which has one or more grooves 5 extending downwardly within the wall thereof. Detachably mounted in each of the openings 4 is a foraminous cup or container 6 which may be provided at its upper end with an annular rib 7 adapted to bear down on the table and support the cup. Each cup is also provided with one or more nodes or projections 8 adapted, when the cup is inserted into one of the openings 4, to slide within the groove or grooves 5 and, after the rib has come against the top of the table 2, the cup can be rotated slightly to move the node away from its groove 5 and under the table. Thus the cup is locked to the table and cannot be removed unless first turned back to bring the node into line with its groove.

Figures 3, 4:
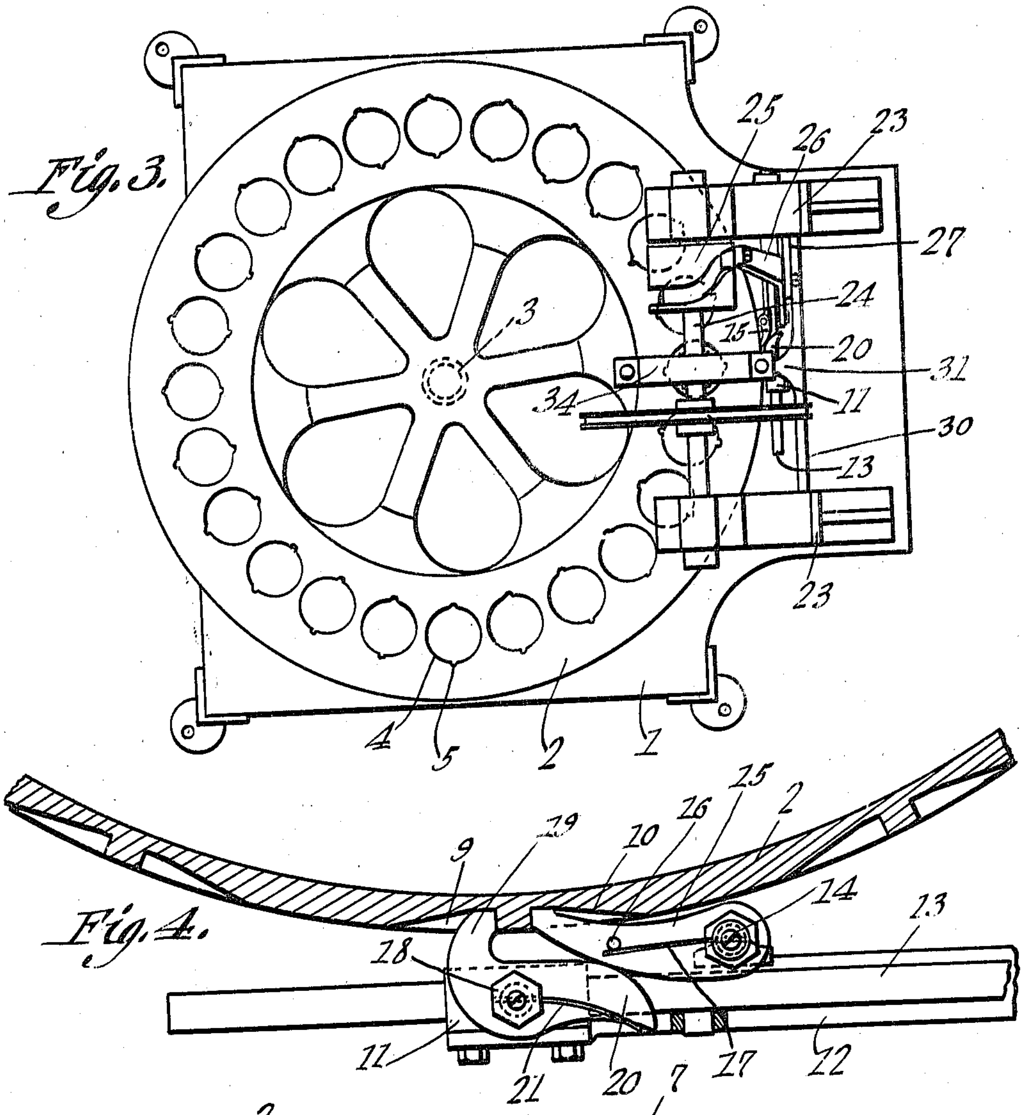
Fig. 3 is a plan view, with cups removed.
Fig. 4 is a plan view of the table engaging portion of the operating mechanism.
Figure 5:
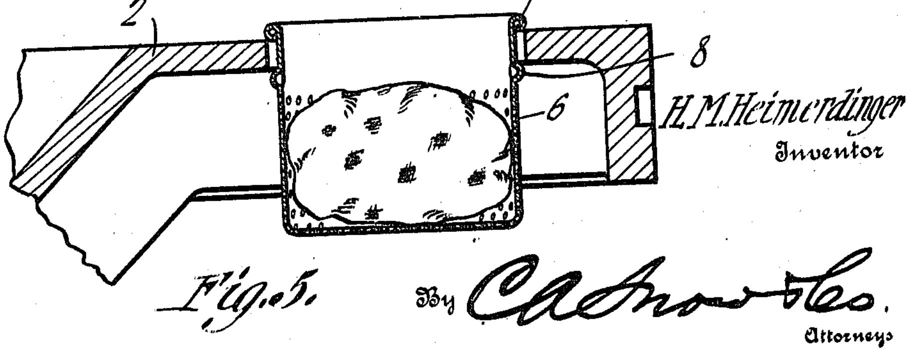
Fig. 5 is a section through one of the cups or receptacles.

Formed in the periphery of the table are notches 9 and 10 arranged in pairs, the notches of each pair being oppositely arranged, as shown in Fig. 4. Bearing blocks 11, which are connected by a base strip 12, are secured to the supporting structure 1 close to the table and mounted to reciprocate therein on a bar 13. A stud 14 extends upwardly from one side of this bar and has a shifting pawl pivoted thereon as indicated at 15, there being a pin 16 on the pawl which is engaged by one end of a spring 17 extending from the stud 14. This spring serves to hold the pawl normally pressed against the periphery of the table 2. Another stud 18 extends from one of the blocks 11 and has a checking or stop dog 19 pivotally mounted thereon, there being a cam arm 20 extending from the dog and engaged by a spring 21 projecting from the stud 18. This spring presses the cam arm 20 toward the table 2 so that the locking end of the dog is normally disengaged from the table.

Mounted on the structure 1 are standards 23 supporting a shaft 24 which is journaled in the upper portions thereof. This shaft has a cam 25 which is engaged by the upper end of a lever 26 fulcrumed, as at 27, upon a bracket extending from one of the standards 23. The lower end of the lever is slotted, as at 28 and engages a stud 29 projecting from the bar 13. Thus it will be seen that when the shaft 24 is rotated the cam 25 will oscillate the lever 26 and cause the bar 13 to reciprocate. When the bar is moved in one direction the pawl 15 will enter one of the notches 10 and thrust against its end wall, thereby to rotate the table 2 until the pawl comes against the cam arm 20 of the dog 19 whereupon said dog will be shifted inwardly into the adjacent notch 9 and hold the table against further movement. Thus the table is stopped positively when moved a predetermined distance by the pawl and accurate positioning of the cups 6 is insured.

The standards 23 are connected by cross bars 30 having bearings 31 for a sliding rod 32. A plunger 33 is connected to the lower end of the rod and has a highly polished face so that, when in use, the material being acted on will not adhere thereto. An eccentric strap 34 is pivotally connected to the upper end of the rod 32 and is engaged and actuated by an eccentric 35 on the shaft 24. The cam 25 and the eccentric 35 are so timed that, during the rotation of the shaft 24 the table will be rotated to bring a cup 6 to position under the plunger and the plunger will be moved downwardly into and then upwardly from the cup after which another cup will be brought to position and the foregoing operation repeated.

As hereinbefore stated each cup 6 is foraminous. It is rigid and made by stamping small holes in the bottom and wall of the cup. Thus when the plunger is forced against material contained in the cup, said material will be discharged through the holes. For the purpose of spreading this discharged material to facilitate drying thereof, a spreading cone 36 is arranged under the table in vertical alinement with the plunger 33, this cone being secured to the upper end of a shaft 37 journaled in an arm 38 extending under the table from the structure 1. A pulley 39 is secured to the shaft and another pulley 40 is secured to the shaft 24, these pulleys being connected by a belt indicated in diagram at 41. Thus it will be seen that the cone will, during its rotation, scatter broadcast the material dropping thereonto from the cup thereover and by providing a drying belt 42 the scattered material will fall thereon and thus be conveyed in a spread out condition, to a suitable drier, not shown.

Spaced air flues 43 can be located at any suitable point so that, as the table is rotated, the cups, after leaving the plunger, will be brought successively into line with the flues. By setting up a strong current of air through the flues any matter within the cups will be disengaged therefrom and carried off by the air current so that the cups will be left in a clean condition and ready to be furnished with a new supply of material for treatment.

In operation the potatoes or other articles, after being thoroughly cooked, are placed by any suitable means, into the foraminous cups and as the table is intermittently rotated the cups will be brought to position under the plunger in succession. The plunger will press down on the contents of the cup thereunder and force the pulp of the material through the skin thereof and through the holes in the cup and the grains thus produced will fall on the rotating cone 36 which will spread them on the apron 42 which carries them to the drier. As the cups are moved away from the path of the plunger they will be brought into line with the flues 43 and the skin and other extraneous matter in the cup will thus be removed.

By locking the cups to the table as described the suction due to the upward movement of the plunger within the cup will not cause the cup to move upwardly with the plunger.

In practice it has been found necessary to use perforated metal in the construction of the cups, thus to get a rigidity that is not possible where a screen is used. It is also essential that apertures be made in the wall as well as in the bottom of the cup to permit lateral escape of material in the side portions of the cup.

What is claimed is:—

1. A machine for making a food product, comprising a plunger, a perforated cup movable into position in the path of the plunger, and means for scattering broadcast the material pressed through the cup.

2. A machine of the class described including a plunger, a carrier, a press cup having rigid walls provided with perforations therein and having means for detachably fastening it to the carrier, and actuating means for the carrier to move the cup into the range of action of the plunger.

3. A machine of the class described including a plunger, a press cup having rigid walls and perforations therein, a conveyer, and means for scattering broadcast over the conveyer the material forced through the cup by the plunger.

4. A machine of the class described including a plunger, a press cup having rigid walls provided with perforations, means operating in timed relation with the plunger for moving the cup into the range of action of the plunger, a conveyer, and a rotatable cone for receiving material pressed through the cup by the plunger and scattering it onto the conveyer.

5. A machine of the class described including a plunger, a carrier, a press cup having rigid walls provided with perforations therein and having means for detachably fastening it to the carrier, actuating means for the carrier to move the cup into the range of movement of the plunger, and means for automatically stopping the movement of the carrier when the cup is brought to such position.

6. A machine of the class described including a plunger, a carrier, a series of press cups on the carrier and having openings therein, a cleaning flue, and means operating in timed relation with the plunger for moving the carrier to bring the cups successively into the path of the plunger and from the plunger into line with the cleaning flue.

In testimony that I claim the foregoing as my own, I have hereto affixed my signature in the presence of two witnesses.

HARRY M. HEIMERDINGER.

Witnesses:
IVY E. SIMPSON,
AGNES ROCKELLI.